Oct. 3, 1939.  H. C. MUMMERT  2,175,156
CRANKSHAFT
Filed May 1, 1937      2 Sheets-Sheet 1

INVENTOR.
HARVEY C. MUMMERT.
BY
ATTORNEYS.

Oct. 3, 1939.     H. C. MUMMERT     2,175,156
CRANKSHAFT
Filed May 1, 1937     2 Sheets-Sheet 2
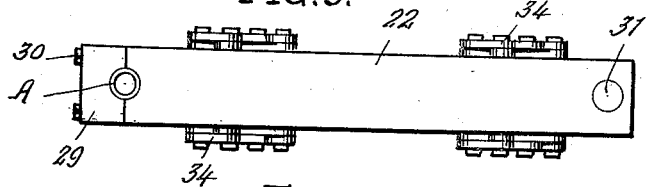
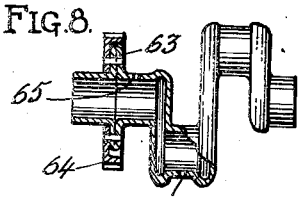
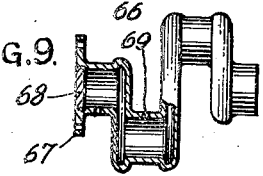
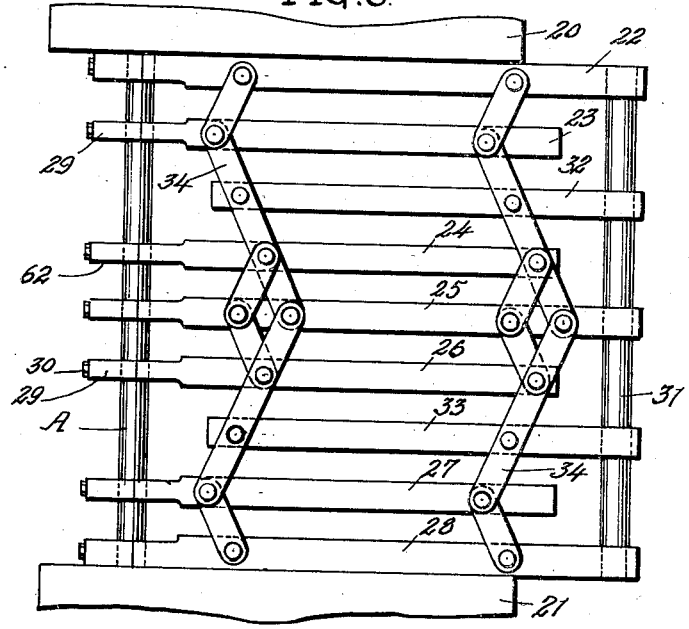
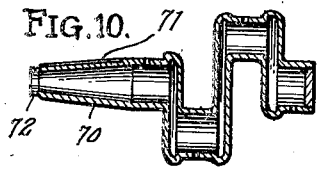
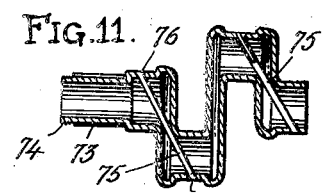
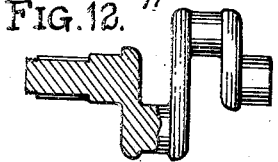
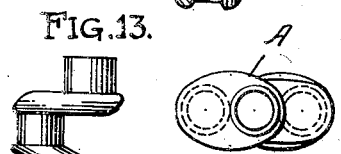
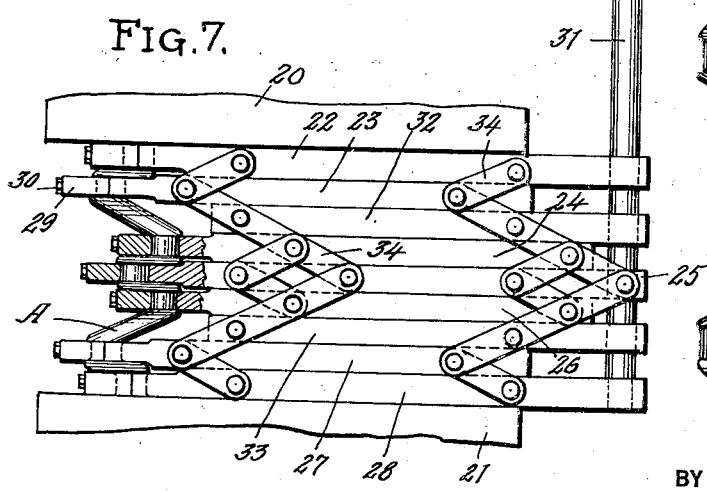
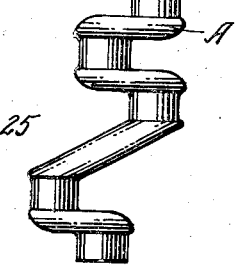
INVENTOR
HARVEY C. MUMMERT.
BY
ATTORNEY Patented Oct. 3, 1939

2,175,156

UNITED STATES PATENT OFFICE 2,175,156

CRANKSHAFT

Harvey C. Mummert, Hammondsport, N. Y.; Edna Mummert administratrix of said Harvey C. Mummert, deceased Application May 1, 1937, Serial No. 140,179

2 Claims. (Cl. 74—596)

My invention relates to crankshafts, and more particularly to engine crankshafts, and is concerned also with a method and apparatus by which crankshafts are forged from a one-piece initially straight blank.

One object of the invention is to provide a one-piece engine crankshaft, preferably hollow, consisting of a single length of bent metal tubing having a substantially uniform wall thickness throughout.

Another object of the invention is to provide an engine crankshaft thus characterized in which the grain flow of the metal of the tube follows the contour of the shaft.

Another object of the invention is to provide a one-piece hollow engine crankshaft having one or more main journals, one or more crankpin journals, and crankcheeks extending from one to the other thereof; the crankshaft consisting of a single length of metal tubing of circular cross-section throughout those portions of its length constituting the main and crankpin journals and of out-of-round cross-section throughout those portions of its length constituting the crankcheeks.

Still another object of the invention is to provide an engine crankshaft in which substantially the final form thereof is obtained by a single forging operation.

An engine crankshaft formed as herein contemplated is stronger per unit of weight than existing types of crankshafts and can be manufactured at a substantial saving both in material and manufacturing costs.

The method by which the crankshaft is formed consists in clamping an initially straight blank at the point or points therealong at which the cranks are to be formed, and also intermediately thereof, and then forcing all clamps to close together axially while simultaneously forcing only the first said clamps to move laterally. In other words, I clamp the blank at the throw and journal zones and then close together all clamps while at the same time forcing the throw-forming clamps to move laterally.

The apparatus employed, as distinct from the method, comprises three or more die-bars clampable on the blank. At least one of said die-bars is movable laterally of the shaft axis, while at least two are movable simultaneously axially relatively to each other. The laterally movable bars are movable to form the one or more offsets, while the bars constrained against lateral movement, though movable axially, are movable to form the one or more journal elements of the shaft.

Since both the method and apparatus are new and novel, each may be said to constitute a further feature of my invention.

Other objects and advantages of the invention will be hereinafter more fully set forth.

In the drawings, wherein like reference characters denote like or corresponding parts:

Fig. 5 is an end view of a modified form of apparatus adapted to the production of a four-throw, three-bearing crankshaft of the type illustrated in Figs. 13 and 14;

Fig. 6 is a side elevation of the apparatus of Fig. 5 with the shaft blank in place and the apparatus extended or opened up;

Fig. 7 is a view similar to Fig. 6 showing the position of the die-bars after a forging operation has been completed;

Figs. 8, 9, 10 and 11 are fragmentary views, either partly or wholly in section, showing different treatments of shaft-ends and different lubricating methods;

Fig. 12 is a fragmentary view, partly in section, of a solid as distinct from a tubular shaft; and Figs. 13 and 14 are side and end views, respectively, of that type crankshaft formed by the apparatus of Figs. 6 and 7.

Figure 1:
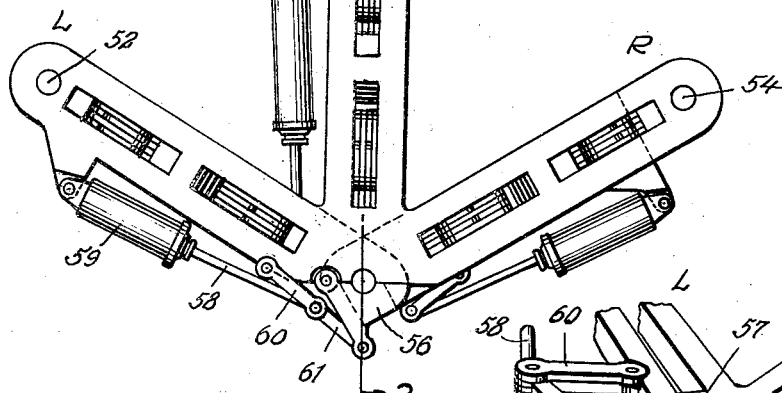
Fig. 1 is an end view of one form of apparatus adapted to the production of a six-throw, seven-bearing crankshaft.

Referring first to Figs. 6 and 7, wherein an apparatus adapted to the production of an engine crankshaft of the type shown in Figs. 13 and 14, is illustrated, 20, 21 designate the platens of a suitable hydraulic or other type press between which the initially straight shaft blank A is adapted to be placed. In its unbent or original shape, the blank A is held between the platens 20, 21 by suitable die-bars 22, 23, 24, 25, 26, 27 and 28—seven in all to correspond with the number of journals (both main and crankpin) formed when the shaft is bent or squeezed into final shape. The platens 20, 21 are preferably respectively fixed and movable.

All of the die-bars excepting the end die-bar 28, are movable axially of the blank A, and each at one end is adapted to embrace the blank at those points along its length where the main and crankpin journals are to be formed. Caps or clamps designated as 29, held in place by cap screws 30, are provided for this purpose. The die-bars 23, 24, 26 and 27, in addition to being movable axially of the blank, are movable crosswise or laterally of said axis and terminate at one end short of the corresponding ends of the die-bars 22, 25 and 28. The die-bars 23, 24, 26 and 27, which are free to move laterally, are the crankpin-journal-forming die-bars of the apparatus, while the bars 22, 25 and 28, which are incapable of lateral movement, are the bars which form the main journal elements of the shaft.

A guide-rod 31 fastened to the fixed die-bar 28 and extended through each of the die-bars 25 and 22 holds the latter, as well as two intermediately located spacer bars against lateral movement. The spacer bars, designated as 32, 33 it will be noted, while they embrace the guide-rod 31, do not (in the embodiment illustrated) contact either the finished shaft or the initially straight blank.

To hold the total number of die-bars and spacer bars apart before squeezing pressure is applied, and to guide the movement of said bars in a forging or closing-in operation, I provide, in addition to the guide-rod 31, two or more sets of interconnected toggle links 34. These sets of links are properly dimensioned and so pivotally connected to each other and to the bars, as to hold the latter, at all times, and under all operating conditions, in parallelism, and substantially equidistantly spaced one from the other, notwithstanding the fact that certain of the bars are movable axially and laterally, while others are movable axially only. In other words, the linkage arrangement is such that adjacent bars and the interconnecting links form parallelograms.

Figure 2:
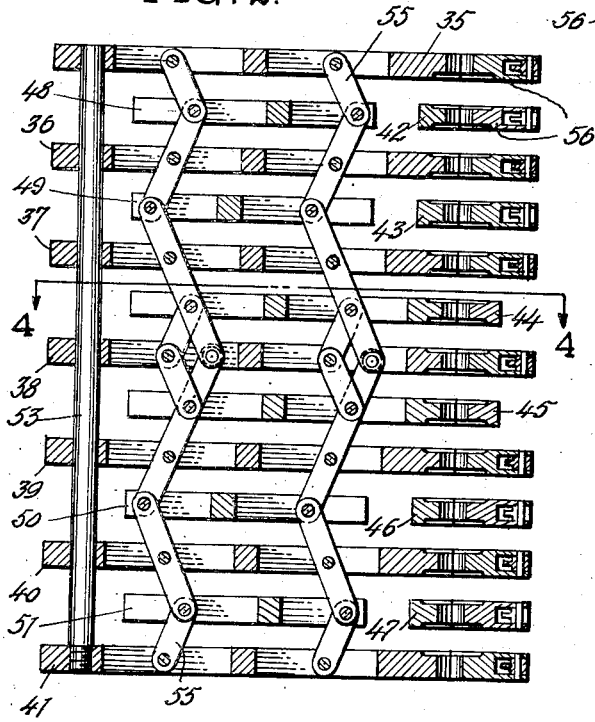
Fig. 2 is a section on the line 2—2 of Fig. 1.
Figure 4:
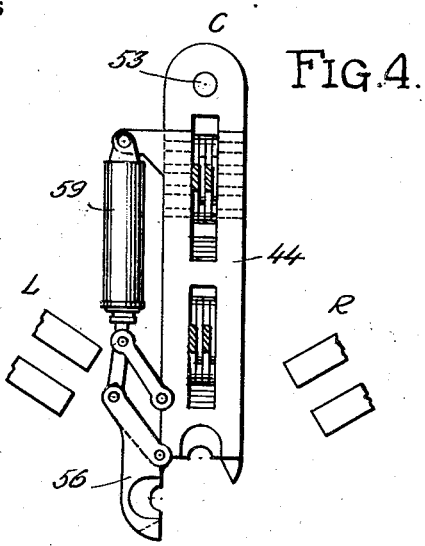
Fig. 4 is a partial section on the line 4—4 of Fig. 2.

The apparatus shown in Figs. 1 and 2 differs from that shown in Figs. 6 and 7 in that the former is adapted to the production of a six-throw crankshaft having seven main journals and six crankpin journals, whereas the latter is adapted to the production of a four-throw crankshaft having three main journals and four crankpin journals. In the embodiment of Figs. 1 and 2, three banks of bars are provided, the banks being spaced 60° apart to admit of the production of a six-throw shaft in which the crankpin journals are disposed in pairs, and in which the pairs are equally spaced 120° apart.

Each bank of the apparatus comprises a total of thirteen bars. Seven of the bars of each bank are die-bars clampable about the shaft blank at the points along its length where the main journals are to be formed; two are die-bars clampable about the blank at the points along its length where the crankpin journals are to be formed; and the remaining four bars of each bank are spacer bars. The corresponding main-journal-forming die-bars of the respective banks are preferably integrally united and are designated, respectively, 35, 36, 37, 38, 39, 40 and 41. The crankpin-journal-forming die-bars are designated, respectively, 42, 43, 44, 45, 46 and 47. Of this latter set of die-bars, each bank includes two, i. e., the bank marked L includes the die-bars 42 and 47; the bank marked C includes the die-bars 43 and 46; and the bank marked R includes the die-bars 44 and 45. The four spacer bars shown are designated, respectively, 48, 49, 50 and 51. As previously stated, four such spacer bars are provided for each bank. The reason for providing but two crankpin-journal-forming die bars in each bank is that in the conventional type seven-bearing, six-throw crankshaft the crankpin journals are arranged in three pairs, the pairs in each instance being extended off from the crankshaft axis at 120° intervals. The arrows in Fig. 1 indicate the direction in which the crankpin-journal-forming die-bars are adapted to move in a forging operation.

As in the type apparatus shown in Figs. 6 and 7, all of the main-journal-forming die-bars excepting the die-bar 41, are movable axially only, whereas the crankpin-journal-forming die-bars are movable both axially and laterally. Means similar in character to the links 34 and guide-rod 31 of Figs. 6 and 7 is provided to insure that the movement of the bars shall be as stated. In the more complex embodiment, however, instead of a single guide-rod, three guide-rods designated, respectively, 52, 53 and 54 are provided. These guide-rods are carried by the corresponding end or fixed die-bars 41, one at the outer end of each bank of bars, and each rod extends through each of the die-bars adapted to move axially only. Also, as in the showing of Figs. 6 and 7, suitable linkage 55 is provided to coordinate and synchronize the movement of all of the movable bars. In Fig. 2 of the drawings, one such linkage arrangement is suggested. By reference to said figure, it will be noted that the linkage is carried through the inter-connected bars rather than against the opposite edges thereof as disclosed in the simpler form of apparatus.

Figure 3:
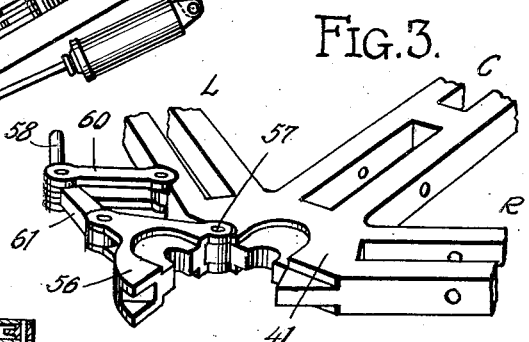
Fig. 3 is a fragmentary perspective view of one of the die-bars of the apparatus of Fig. 1.

The clamping devices used in the form of apparatus shown in Figs. 1 and 2 are best illustrated in Fig. 3. A description of one such clamp and its operating mechanism will suffice for all, as it is intended that each die-bar be equipped with its individual clamp. The die-bars are fitted each with a cap 56 mounted to swing on a hinge-pin 57. These caps can be quickly opened up or closed by means of rods 58 fastened to pistons (not shown) operating in cylinders 59, the rods being connected to the caps 56 by links 60 and 61. In the closed position of the caps, the links 60 and 61 are adapted to align one with the other to form what may be termed a "dead-center" lock. The pistons, if desired, may be operated either pneumatically, hydraulically or by steam.

In Figs. 8, 9, 10 and 11 I have illustrated various oiling methods and various shaft end treatments for hollow shafts made as herein contemplated. In Fig. 8 the tube is compressed endwise in a fixture until a wrinkle is formed in the tubing wall. This wrinkle is further compressed to provide a double walled flange 63 to which a gear 64, sprocket, pulley or other appropriate driving connection is attached. If desired, a main journal can be formed on each side of the flange. Oil may be admitted at one end of the shaft and allowed to flow out of the other. Oil holes 65 and 66 drilled through the shaft wall at the journals provide the journals with lubricant. In the case of heavily loaded journals, large quantities of oil may be circulated for cooling purposes.

In Fig. 9, the end of the shaft is flared out to provide a simple flange 67. The flange thickness may be increased by first upsetting the tube. The end of the shaft is shown closed by a plug 68 and oil is admitted from the main journal through a hole 69.

In Fig. 10, the same type oiling system is shown as in Fig. 9. The end of the shaft, however, is swaged down to tapered form, as indicated at 70. In this showing, the wall thickness is increased by upsetting, a keyway is cut as at 71, and the end of the shaft is threaded as at 72 to receive a nut.

In Fig. 11, the wall thickness is increased as in Fig. 10, and a straight multiple spline cut therein as indicated at 73. Again, the end of the shaft may be threaded as at 74. In this case, the shaft is not filled with oil, but oil is carried from the main journals to the crankpin journals through small tubes 75 swaged into tapered holes 76 and 77.

Also, as illustrated in Fig. 12, a solid shaft, as distinct from a tubular shaft, may be made by this same method or process.

The mode of operation of each type or form of apparatus disclosed is generally the same. The same basic features of design are embodied in each. Briefly, the mode or method of operation is as follows—reference being had only to the showing of Figs. 6 and 7. With the die-bars appropriately spaced the shaft blank A is clamped in place—each die-bar embracing the blank at those points along its length where the journals are to be formed. With the blank thus clamped, pressure is brought to bear on the end die-bars 22 and 28 by means of the hydraulic or other type press. As the end bars 22, 28 are squeezed together, the bars 22, 32, 25, 33 and 28 travel only in a vertical or axial direction, while the bars 23, 24, 26 and 27 are given a combined vertical and lateral movement by means of the linkage 34. It will be noted that the linkage arrangement is such that bars 23 and 27 will move to the left, and bars 24 and 26 to the right. These four bars (23, 24, 26 and 27) by their lateral movement form the crankpin journals of the shaft, while the bars 22, 25 and 28, which are held by the guide-rod 31 against lateral movement, form the main journals of the shaft. By squeezing the bars together until the apparatus has collapsed from the open position illustrated in Fig. 6 to the closed or collapsed position illustrated in Fig. 7, the forging operation is completed. This having been done, it remains necessary only to unclamp the shaft and thereafter remove it from the apparatus.

Still referring to Figs. 6 and 7, attention is called to the fact that if the bars 32 and 33 were extended to the left and fitted with caps to embrace or clamp the blank A, a five-main journal instead of a three-main journal shaft would be produced; also, if desired, and as herein contemplated, the die-bars may all be end-shaped or recessed as indicated at 62 to form the crankcheeks. In other words, the shape of the die-ends of the die-bars controls to a large extent the final shape of the crankcheeks. The size of the cheeks and the amount of lip overhang at the juncture between the cheeks and journals is controlled or varied by varying the length of the blank and the initial spacing of the bars.

A crankshaft of the type herein contemplated is advantageous as compared to existing or conventional types, in that it can be forged in a single operation, is stronger per unit of weight, and can be produced at a substantial saving in raw stock, manufacturing equipment, manufacturing materials, labor cost, and machining time.

In substantiation of the above statement, it need only be pointed out that the usual practice in producing engine crankshafts in large quantities, and especially four and six-throw engine crankshafts such as are used in automobiles, is as follows: Raw stock is purchased in rough billets about four inches square, two feet long and weighing about one hundred pounds. These billets are fed into a long or continuous furnace by one man at the rate of approximately one a minute. To heat these billets to a uniform forging temperature a large quantity of fuel is required to be used. At the other or outlet end of the furnace, another man is employed to remove the heated billets and pass them on to the first hammer or forging crew. The first hammer to act upon the heated billets has three sets of dies. By means of the first or break-down dies, the square billets are broken down into roughly round form and the metal bunched-up in those areas where an excess of metal is required (those areas where the crankcheeks are to be formed). Anywhere from twelve to fourteen blows are struck in this initial die-forming operation. Next a so-called snaking die is used to roughly bend the rough round billet into approximately crankshaft form. At least three blows are required to be struck in this so-called snaking operation. The billets are then placed in forming dies to be given a final crankshaft forging form. From six to eight blows are required to be struck in the forming dies. It is during this latter or forming operation that the excess of metal is squeezed out through the edges of the dies to thereby form what is generally called the flash. From the first hammer crew, the then partially forged crankshaft is passed on to a second crew and given several blows in a so-called finishing die. From the second crew it is passed on to a third crew to be trimmed by means of trimming dies, after which it again is passed to the second crew where it is struck again in the finishing die to true it up before it is passed on to a fourth crew, where the end of the shaft is upset to provide a driving flange. In its finished forged form the crankshaft weighs roughly sixty pounds—forty pounds having been removed from the billet in the forging process.

By the method and apparatus of the present invention, an initially straight tube, weighing approximately twenty-five pounds can be forged in a single operation, to produce a crankshaft of less weight and of equal or greater strength than a crankshaft formed by the older method from a billet weighing one hundred pounds or more. A saving in material of approximately seventy-five percent is thus effected. Also, a furnace of half the capacity can be used to take care of approximately four times the number of shafts for a given amount of heat—this because of the lesser amount of material required to be heated to a forging temperature per unit shaft. A saving in heat cost of approximately eighty-seven and a half percent is thereby effected. Moreover, a press crew of two men can take care of the shafts from the smaller furnace and form them at the rate of four a minute. A second press or hammer crew can flange the ends of the shafts at the same rate. Thus, only two comparatively light presses are required to be used in place of four heavy hammers to produce four times as many shafts. The dies for the shaft forgings under the older practice cost approximately $5000 and have to be replaced after each five thousand shafts are forged. Where my improved method and apparatus are used, the apparatus per se costs considerably less and can be used to forge a much greater number of shafts. There would also be effected a considerable saving in machining time as the forged tubular shaft can be made more closely to size. Under the older practice a crew of eighteen men is required to produce one forged shaft per minute, whereas under my improved method, a crew of seven men can produce four tubular shafts per minute, thereby saving approximately ninety percent in labor cost alone. And on top of all this saving in cost and material, the shafts produced by my improved method, whether hollow or solid, are stronger per unit of weight, the added strength resulting from the fact that the grain flow of the metal follows closely the contour of the shaft, and in a hollow shaft, is confined to the outer surface of the shaft where the fibre stress is greatest.

From the above, it is obvious that a hollow shaft, forged or produced as herein contemplated, is more flexible, stronger, lighter, without seams or joints, and of substantially uniform wall thickness throughout. The crankcheek portions, although squeezed or flattened to an out-of-round cross-section in the forging operation, are equally as strong as the persistently round journal portions of the shaft. Forging is accomplished in a single operation by one continuous externally applied force acting in one direction only. Under the older practice, the shaft is formed by changing the cross-section of the billet without appreciably changing its length. Under my improved practice, the length is greatly reduced, while the cross-section changes only slightly.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. As an article of manufacture, a forged crankshaft comprising a main and a crankpin journal and a connecting cheek, the journals of the crankshaft being hollow and of circular cross-section and the crankshaft in its entirety being formed from a single length of bent metal tubing having a substantially uniform wall thickness throughout, said crankshaft being characterized in that the grain flow of the metal of the tubing follows the contour of the shaft and the crankcheek portion thereof is forged to an out-of-round cross-section and, as viewed in the direction of the axis of the crankshaft, to a substantially elliptical shape.

2. As an article of manufacture, a forged crankshaft comprising a main and a crankpin journal and a connecting cheek, the journals of the crankshaft being hollow and of circular cross-section and the crankshaft in its entirety being formed from a single length of bent metal tubing having a substantially uniform wall thickness throughout, said crankshaft being characterized in that the grain flow of the metal follows the contour of the shaft and the crankcheek portion thereof is flattened by forging to an out-of-round cross-section.

HARVEY C. MUMMERT.